United States Patent [19]

Korpi et al.

[11] Patent Number: 5,061,317
[45] Date of Patent: * Oct. 29, 1991

[54] COLORED NACREOUS PIGMENT AND A METHOD FOR ITS PREPARATION

[75] Inventors: Taina M. Korpi, Lappeenranta; Seppo J. O. Hyttinen, Valkeakoski; Pekka J. Vapaaoksa, Pori, all of Finland

[73] Assignee: Kemira Oy, Helsinki, Finland

[ * ] Notice: The portion of the term of this patent subsequent to Nov. 28, 2006 has been disclaimed.

[21] Appl. No.: 298,165

[22] Filed: Jan. 18, 1989

[30] Foreign Application Priority Data

Jan. 22, 1988 [FI] Finland .................................. 880306

[51] Int. Cl.⁵ .............................................. C04B 14/20
[52] U.S. Cl. ..................................... 106/417; 427/218; 427/337; 428/363; 428/404; 106/DIG. 3
[58] Field of Search ............... 106/417, 418, 409, 415, 106/487, DIG. 3; 428/404, 363; 427/218, 337

[56] References Cited

U.S. PATENT DOCUMENTS

| | | | |
|---|---|---|---|
| 4,192,691 | 3/1990 | Armanini | 106/417 |
| 4,883,539 | 11/1989 | Mattila et al. | 106/417 |

FOREIGN PATENT DOCUMENTS

| | | | |
|---|---|---|---|
| 911270 | 10/1972 | Canada | 106/417 |
| 0325484 | 7/1989 | European Pat. Off. | 106/417 |
| 0218156 | 4/1987 | Fed. Rep. of Germany | 106/415 |
| 0038764 | 3/1983 | Japan | 106/417 |
| 1402603 | 6/1988 | U.S.S.R. | 106/417 |

*Primary Examiner*—William R. Dixon, Jr.
*Assistant Examiner*—Paul Marcantoni
*Attorney, Agent, or Firm*—Dressler, Goldsmith, Shore, Sutker & Milnamow, Ltd.

[57] ABSTRACT

The invention relates to a new nacreous pigment which contains a dye or a color pigment and is based on metal-oxide-coated mica particles or other layer silicate particles, and to a method for preparing it. The pigment particles consist of metal-oxide-coated, porous silica skeletons of mica particles or of other silicate particles, containing few or no cations and having at least one dye or color pigment attached to them. In the method, a) a preliminary-stage product is prepared from mica particles or other layer silicate particles and a metal-oxide coating, the metal-oxide coating being poorly soluble or insoluble in acids, b) the thus obtained metal-oxide-coated mica particles or other layer particles are leached with a mineral acid, possibly together with an oxidant, and c) the dyeing of the thus produced metal-oxide-coated, porous silica skeletons of mica particles or of other layer silicate particles, containing few or no cations, is carried out using at least one dye or one color pigment.

15 Claims, No Drawings

COLORED NACREOUS PIGMENT AND A METHOD FOR ITS PREPARATION

The present invention relates to a new nacreous pigment which contains a dyestuff or a color pigment and which is based on metal-oxide-coated mica particles or on other layer silicate particles, and to a method for its preparation.

When a nacreous pigment is colored by means of dyestuffs or color pigments, there is a problem in that only part of the dyestuff or color pigment will be retained by the pigment particles. Attempts have been made to improve the attachment of colorants by means of chemical reactions. DE patent publication 2 429 762 discloses dyestuff-containing, metal-oxide-coated mica pigments in which so-called aluminum color lacquers are used; by mediation of an aluminum hydroxide layer precipitated in advance on the surface of the particles, these lacquers attach waterproofly to the particle surfaces. According to DE lay-open print 2 928 287, attempts have been made to improve these dyestuff-containing mica pigments by means of an organic additive. DE application publication 3 536 168 for its part discloses a method for dyeing pigments in which vat dyes are first rendered soluble by means of a reduction reaction, whereafter they are precipitated by oxidation onto the pigments added to the solution in the vat.

The above-mentioned methods, according to the state of the art, all presuppose the use of extra steps and reagents in connection with the dyeing and are therefore expensive and disturbance-prone. The object of the present invention is to provide a product and method by means of which these disadvantages can be eliminated. The invention is thus primarily characterized by what is stated in the characterizing clauses of the claims. It has thus surprisingly been observed that a pre-treatment which renders metal-oxide-coated mica particles more lustrous and more reflective also improves their capability to be dyed to the extent that it even enables them to be dyed directly, without using in the dyeing step any extra color-fixing agents or precipitation agents.

The invention thus relates to a dyestuff-containing or color-pigment-containing nacreous pigment which is based on metal-oxide-coated mica particles or on other layer silicate particles, and the particles of which consist of metal-oxide-coated silica skeletons of porous mica particles or of other layer silicate particles which contain few or no cations, there being at least one dyestuff or color pigment retained by the skeletons. The amount of the retained dyestuff or color pigment varies greatly, and is preferably within a range of approximately 1–50% by weight of the amount of pigment to be dyed.

The invention also relates to a method for the preparation of a dyestuff-containing or color-pigment-containing nacreous pigment based on metal-oxide-coated mica particles or on other layer silicate particles, wherein (a) from mica particles or other layer silicate particles and a metal-oxide coating a preliminary-stage product of coated mica particles or of other layer silicate particles is prepared in which the metal-oxide coating is poorly soluble in acid or insoluble in acid, (b) the coated mica particles or other layer silicate particles thus obtained are leached with a mineral acid, possibly together with some oxidant, and (c) the thus produced metal-oxide-coated, porous silica skeletons of mica particles or of other layer silicate particles which contain few or no cations are dyed by using at least one dyestuff or color pigment.

In our FI patent application 871 644, steps (a) and (b) have been used to give a pigment brightness, whiteness and luster, but their exceptionally good capability of being dyed was then not yet known or anticipated. It can thus be said that the present invention also relates to a method for treating with a colorant the coated layer silicate particles according to patent application 871 644, in which case steps (a) and (b) can be carried out according to any embodiment within the protective scope of the above-mentioned FI patent application.

Since steps (a) and (b) crucially improve the retention of colorants by metal-oxide-coated mica particles or other layer silicate particles, step (c) may be any method, known in the art, of dyeing a solid substance. Examples which can be mentioned include so-called direct dyeing, in which the dyestuff attaches to the substrate directly, for example, from water, from an aqueous solution of a salt, an acid or a base, or from an organic solvent; leaching-precipitation dyeing by means of sulfur dyes, vat dyes or other similar dyestuffs; reaction or complex-formation dyeing; pigment dyeing; and dyeing by means of a metal oxide, a natural dye or a basic dyestuff. However, the advantage of the present invention is most evident in those dyeing methods which have a low rate of success by the methods of the above-mentioned state of the art, for example, the direct dyeing method.

According to one embodiment of the invention, direct dyeing can be carried out as follows: the pigment and an organic dyestuff are mixed together in hot water or an organic solvent, the water or organic solvent is evaporated, and finally the product is preferably rinsed and dried. In accordance with this embodiment, large amounts of dyestuff can be bound to the pigment. In some cases, an extra post-treatment stage is needed, in which the dyed nacreous pigment is, for example, treated in a medium by means of a fixing agent, and the medium is evaporated.

According to another embodiment of the invention, direct dyeing can be carried out by slurrying the pigment and the dyestuff separately in water; the latter, when necessary, with an addition of a dispersant, of an organic acid, of a pH control agent and/or of other additives. The obtained mixture is heated to its boiling point, or close to its boiling point, and is kept at that temperature for a predetermined time. Finally the dyed pigment is filtered, rinsed and dried.

Experiments carried out in connection with the present invention all indicate that metal-oxide-coated mica particles or other layer particles leached in the said manner can be dyed by all known textile, leather, food, or other dyes and by all known methods of dyeing textile, leather, foodstuffs, etc. A thus wide a protective scope of the invention is, however, a natural consequence of the fact that, owing to the method according to the said FI patent application, the structure of the pigment has changed so that its dyeing properties substantially correspond to those of a textile or a textile-resembling retentive material.

The colorant-containing nacreous pigments according to the invention may be based on almost any known mica types or on other silicates having a layer particle form. It is, however, advantageous to apply the invention to so-called dark micas, since thereby the brightness, luster and color of the pigments are improved. Phlogopite is an especially suitable mica; its dyeing properties become better than those of both dark and light-colored micas. The width of mica particles is in general about 5–300 μm and their thickness about 0.1–5 μm.

Because of their advantageous refractive index, titanium dioxide and/or zirconium dioxide, preferably titanium dioxide, is used for the metal oxide coating. The color of the nacreous pigment is dependent on the thickness of the titanium-dioxide coating and may vary from silver or gold color throughout the range to a red, blue, violet or green interference color. The thickness of the metal oxide layer on the surface of a mica particle or other silicate particle is about 0.01–0.5 μm, preferably 0.07–0.3 μm. The coating may also contain other metal oxides which impart additional color, in which case there is the limitation that the coating formed by them must not dissolve during the acid treatment.

First a preliminary-stage product of coated particles in which the metal-oxide coating is poorly soluble or insoluble in acid is prepared according to FI patent application 871 644 from mica particles or other layer silicate particles and a metal-oxide coating, and thereafter this preliminary-stage product of coated mica particles or other layer silicate particles is leached by using a mineral acid and possibly an oxidant, until a substantial proportion of the cations of the mica or layer silicate has dissolved, whereby metal-oxide-coated, porous silica skeletons of mica particles or of other layer silicate particles, containing few or no cations, are produced. In the present invention, these coated silica skeletons have been found to be highly capable of being dyed. The dyeing is carried out in substantially the same manner as when dyeing textiles, leather, foodstuffs, or other similar materials.

According to the present invention, coated and acid-treated mica particles or other layer silicate particles can be dyed with conventional dyestuffs and color pigments. These include natural azulene dyes, carotinoids, curcumine, quinone dyes, indigo dyes, melanins, oxazine and phenazine dyes, pteridine, pyrone dyes (anthoxanthin, anthoxanthide), pyrulium dyes (anthocyan, anthocyanidine), and pyrrolide dyes, as well as synthetic acrinine dyes, aniline black, anthraquinone dyes, azine dyes, azo dyes, azomethine dyes, benzo- and naphthoquinone dyes, quinophthalones, indigo dyes, indophenols, indoanilines, indamines, leuco vat dye esters (anthrasols, indigosols, leucosols), naphthal-imide dyes, nigrosine and induline, nitro and nitroso dyes, oxazine and dioxazine dyes, oxidizing dyes (except aniline black), phthalocyanines, polymethine dyes, sulfur dyes, tri- and diaryl methane dyes, thiazine dyes, thiazole dyes, and xanthene dyes. Azo dyes and quinone dyes are especially advantageous. The dying may also be carried out using a finely-divided color pigment, which may be an inorganic pigment of the type of the above-mentioned metal oxides or a suitable organic pigment.

The present invention is illustrated below with the aid of a few examples, of which 1–10 represent the embodiment in which the dyeing is carried out by slurrying the pigment and the dyestuff separately in water, the latter, when necessary, together with a dispersant, with an organic acid, with a pH control agent and/or with other additives, whereafter the obtained mixture is heated to its boiling point, or close to it, and is kept at that temperature for a predetermined time, and examples 11–15 represent the embodiment of the invention in which the dyeing is carried out by mixing the pigment and an organic dyestuff in a hot medium or an organic solvent, and finally by evaporating the water or the organic solvent.

In comparison experiments carried out, it also became clear that the dyed pigments according to the invention ($TiO_2$+phlogopite) had a much deeper and brighter color than had the dyed pigments not treated with acid ($TiO_2$+phlogopite, $TiO_2$+muscovite).

The pigments used in the examples were phlogopite-based pigments coated with $TiO_2$ and thereafter leached with an acid. In the code, P indicates silica or silicic acid, i.e. leached phlogopite, and S indicates a particle size of 0–40 μm. The first number indicates the thickness of the $TiO_2$ layer indicated as the inference degree of the reflected light, starting from 1, which indicates a $TiO_2$ layer so thin that the reflected light is white (silver luster), continuing with 2, which indicates a $TiO_2$ layer of such a thickness that the reflected light is yellowish (gold luster), etc. The second number indicates the crystal form of the $TiO_2$ used; 0 is anatase and 1 is rutile. The dyeing was successful both with anatase and with rutile.

EXAMPLE 1

50 g of PS10 or PS20 (nacreous pigment substrate)
0.5–4.0 g of dyestuff
1 g of dispersant
(the dispersant used is a mixture having the following composition:
62.5% Palegal SF
37.5% Setavin EH)
500 ml of distilled water
Acetic acid for pH control The nacreous pigment is slurried in about 50 ml of distilled water. Likewise, the dye is slurried in about 50 ml of water, and the dispersants and the acetic acid are added. The two slurries are mixed together and boiled for 15 min on a hot-plate, whereafter the mixture, in a decanter, is placed in an incubator for two hours at a temperature of 185°–200° C. Thereafter the color pigment is slurried in 250 ml of distilled water and is filtered using a Buchner funnel. The product is washed with 1500 ml of distilled water. After the wash and a filtration, the color pigment is dried in an incubator overnight at a temperature of 100° C.

Dyestuffs which can be used:

| | |
|---|---|
| Samaron Gelb 4GSL | C.I. ? |
| Samaron Rot HBL | C.I. DISPERSE RED 73 |
| Samaron Blau GSL | C.I. DISPERSE BLUE 165 |
| Samaron Violett HFRL | C.I. DISPERSE VIOLET 26/62 025 |
| Resolin Blau FBL | C.I. DISPERSE BLUE 56/63 285 (S2) |
| Resolin Schwarz 862 | A COMPOSITE DYE |
| Resolin Rot RL | C.I. DISPERSE RED 90 |
| Foron Schwarz PW | A COMPOSITE DYE |
| Dispersol Navy C-4R | C.I. |
| Sirius Lichtgelb GB | |
| Fettgelb 3GL | |
| Sanogran Gelb RCL | (this dye contains in itself a dispersant; dispersant need not be added) |

EXAMPLE 2

50 g of PS10, PS20 or PS21 (nacreous pigment substrate)
0.5–4.0 g of dyestuff
1 g of dispersants:
62-5% Palegal SF -continued 37.5% Setavin EH
500 ml of distilled water
Soda or lye and hydrochloric acid for pH control The nacreous pigment is slurried in 100 ml of distilled water. The dye is slurried in about 50 ml of distilled water and the dispersants are added. The nacreous pigment slurry is placed in a three-necked flask, as is also the dye slurry. Finally the remainder of the distilled water is added. The pH is measured and adjusted to the desired level (pH 1.0-5.0) at a temperature of 70° C.

The slurry is agitated for an hour. It is filtered using a Buchner funnel, and the color pigment is washed with 1000 ml of hot distilled water. It is slurried in about 250 ml of cold distilled water and filtered, and then rinsed with 1000 ml of distilled water. The product is dried overnight in an incubator at 105° C.

Dyestuffs which can be used:

| | |
|---|---|
| Samaron Gelb 4GSL | C.I. ? |
| Samaron Rot HBL | C.I. DISPERSE RED 73 |
| Samaron Blau GSL | C.I. DISPERSE BLUE 165 |
| Samaron Rot 2BSL | C.I. DISPERSE RED 184 |
| Resolin Blau FBL | C.I. DISPERSE BLUE 56/63 285 (S2) |
| Resolin Rot RL | C.I. DISPERSE RED 90 |
| Sirius Lichtgelb GB | |
| Indanthren Blau GC-colloisol | |
| Indanthren Brilliant Violett RK-M | |
| Fettgelb 3GL | |

EXAMPLE 3

50 g PS10, PS20 or PS21 (nacreous pigment substrate)
0.5-4.0 g of dyestuff
400 ml of a liquor having the following composition:
    62.5% Glauber salt, dil. 10%
    35% distilled water
    2.5% acetic acid, dil. 80%

The nacreous pigment is slurried in 100 ml of the Glauber salt solution. The dye is slurried in the remainder of the solution. The containers are rinsed with water which runs into a three-necked flask. Finally the acetic acid is added into the flask. The temperature is raised slowly to 60°-95 ° C., varying according to the dye. The temperature is maintained at a constant level for an hour. After the dyeing, the color pigment is filtered and washed with 1500 ml of distilled water, by using a Buchner funnel and suction. The filtered color pigment is dried in an incubator at a temperature above 100 ° C.

A dyestuff which can be used:
Drimaren Brilliant Grun X-3G

EXAMPLE 4

50 g of PS10, PS20 or PS21 (nacreous pigment substrate)
0.5-4.0 g of dyestuff
510 ml of dyeing liquor:
    2% acetic acid, dil. 10%
    9.8% Glauber salt, dil. 10%
    88.2% distilled water The nacreous pigment is slurried in 200 ml of distilled water and heated on a hot-plate to 60°-95° C. The dye is slurried in a solution of acetic acid and Glauber salt. The remainder of the distilled water is also heated and added to the other solutions in the three-necked flask. The mixture is heated to the above-mentioned temperature and is maintained constant for 60 min. It is agitated throughout the time. After the dyeing, the color pigment is filtered and then washed by filtering 1500 ml of distilled water through it by using a Buchner funnel and suction. After the filtration, the color pigment is dried in an incubator overnight at a temperature of 100 ° C.

Dyestuffs which can be used:
Maxilon Rot M-RL
Indosol Rubinol
Sirius Lichtgelb CB

EXAMPLE 5

50 g of PS10 or PS20
0.5-4.0 g of dyestuff
2 g of sodium acetate
210 ml of dyeing liquor:
    4.8% acetic acid, dil. 10%
    95.2% distilled water A paste is made of the dyestuff and of 3 ml of acetic acid, and distilled water brought to a boil is added. This mixture is added to a slurry of acetic acid, sodium acetate and nacreous pigment. The ingredients are mixed carefully and the hot mixture is placed in an incubator for three hours at 110 ° C. After the dyeing, the color pigment is filtered and then washed by filtering 1500 ml of distilled water through it by using a Buchner funnel and suction. After the filtration, the color pigment is dried in an incubator overnight at 100 ° C.

Dyestuffs which can be used:
Maxilon Rot GRL
Maxilon Gelb 2BL (Glauber salt instead of sodium acetate)

EXAMPLE 6

50 g of PS10 or PS20
0.5-4.0 g of dyestuff
1 g of dispersant:
    62.5% Palegal SF
    37.5% Setavin EH
300 ml of distilled water The dye is mixed with part of the distilled water, and the dispersants are added. The nacreous pigment is slurried in the mixture, and the remainder of the water is added. The slurry is boiled on a hot-plate for about 15 min, after which the decanter is placed in an incubator for two hours at 180°-200 ° C. After the dyeing, the color pigment is slurried in 250 ml of distilled water and is filtered. At the same time it is washed by filtering 1500 ml of distilled water through the color pigment. After the wash, the color pigment is dried overnight in an incubator at 100 ° C.

Dyestuffs which can be used:
Sudan Rot R
Fettgelb 3 GL

EXAMPLE 7

50 g of PS10 or PS20
0.5-4.0 g of dyestuff
400 ml of distilled water

The dye and the nacreous pigment are mixed separately with distilled water and the solutions are combined. The combined solution is agitated at room temperature for 30 min. After the dyeing, the color pigment is filtered and washed with 1500 ml of distilled water. After the wash, the color pigment is dried overnight in an incubator at 100 ° C.

Dyestuffs which can be used:
Sanogran Gelb RCL
Sanogran Schwarz 5BL
Sanogran Violett BL

EXAMPLE 8

50 g of PS10 or PS20
0.5–4.0 g of dyestuff
200 ml of distilled water

The dye is mixed with distilled water. The nacreous pigment is slurried in the mixture, and the remainder of the water is added. The slurry is boiled on a hot-plate for 15 min, whereafter the decanter is placed in an incubator for two hours at 180°–200 ° C. After the dyeing, the color pigment is slurried in 250 ml of distilled water and is filtered. At the same time it is washed by filtering 1500 ml of distilled water through the color pigment. After the wash, the color pigment is dried overnight in an incubator at 100 ° C.

Dyestuff which can be used:
Indocarbon CL konz

EXAMPLE 9

Pre-treatment:
Hot leach
50.0 g of PS10
5.0 g of Naphthol AS-ITR
3 ml of NaOH 50° Bé
500 ml of hot distilled water Naphthol AS-ITR is slurried to form a paste. The paste is heated for 15 min. The paste is dissolved in hot distilled water. The dissolved paste, the nacreous pigment and the NaOH are placed in a three-necked flask. The temperature is raised slowly to 90 ° C. and is maintained constant for 30 min. After the dyeing, the treated nacreous pigment is filtered and dried overnight in an incubator at 100 ° C.

Development:
50.0 g of treated nacreous pigment
3.0 g of Echtorangesalz GC neu
25 ml of hot distilled water
2 ml of HCl, 1N
300 ml of distilled cold water and ice The diazo dye, the hot water and the hydrochloric acid are mixed together. The cold water and ice are added to bring the temperature down to 5°–10 ° C. The mixture is agitated in a decanter for 30 min. Thereafter it is filtered and washed with 1500 ml of distilled water. Soda and dispersants are added to the washing water so as to remove any physically attached dye from the pigment surface. After the wash and a filtration, the color pigment is dried overnight in an incubator at 100 ° C.

EXAMPLE 10

| 50.0 g | PS10 |
| 2.0 g | Naphthol AS-D or AS-ITR |
| 5 ml | NaOH, 38° Bé |
| 10 ml | denatured alcohol |
| 10 ml | distilled water at 70° C. |
| 3 ml | NaOH, 38 Bé |
| 5 ml | formaldehyde, strong |
| 100 ml | distilled water |

-continued

| 2.0 g | Echtorangesaltz GC neu |
| 250 ml | distilled water |
| 50 ml | distilled water |
| 3.5 g | NaCl |
| 0.625 g | Palegal SF |
| 0.375 g | Setavin EH |

The naphthol is slurried with NaOH to form a paste. The alcohol, hot water, NaOH and formaldehyde are added. The mixture is allowed to stand for 10 min. The mixture is added to water-slurried nacreous pigment. The dye salt is dissolved in water, as is also the salt. The solutions are combined and the dispersants are added. This mixture is added to the slurry and is agitated for 60 min at room temperature. The mixture is rinsed with 1500 ml of distilled water, filtered, and dried overnight in an incubator at 100° C.

EXAMPLE 11

| | | A | B | C | D |
| --- | --- | --- | --- | --- | --- |
| PS10 pigment | mg | 3000 | 3000 | 3000 | 3000 |
| Indosolrubinol SFRG | mg | 30 | 150 | 300 | 1500 |
| Water | ml | 30 | 30 | 30 | 30 |

The solutions were heated to about 70° C. under agitation for about 10 min. Thereafter they were evaporated dry in an incubator at a temperature of 110° C. The pigments became colored, forming a successively darker series. The dye did not dissolve in acetone but did dissolve in water. Two of the dyes were fixed by treating them as follows:

Dyed pigments 11C and 11D in the treatment
Procedure

Samples 11C and 11D were digested in 30 ml of an aqueous solution which contained as a fixing agent 180 mg of Indosol E-50 fl, and the solution was evaporated dry.

After the treatment, color did not dissolve from sample 11C either in acetone or in water. From sample 11D, by contrast, part of the color dissolved in water. For this reason the quantity of Indosol E-50 fl was increased to 600 mg. By this treatment, the color in sample 11D was also fixed so that it did not dissolve even in hot water.

EXAMPLE 12

In the above rounds of dyeing, the dye was first crystallized onto the pigment, and in the second treatment it was fixed by using Indosol E-50. In this dyeing, both the crystallization and the fixing were carried out simultaneously. All ingredients were added at the same time. The mixture was heated under agitation and was evaporated dry.

| Procedure | |
| --- | --- |
| PS10 pigment | 3000 mg |
| Indosolrubinol SFRG | 300 mg |
| Na$_2$SO$_4$ | 150 mg |
| Indosol E-50 fl | 300 mg |
| Water | 30 ml |

The treatment of the solution was similar to that in experiment 1.

The color was insoluble both in acetone and in water.

EXAMPLE 13

In this experiment, a different dye was used.

| | |
|---|---|
| PS10 pigment | 3000 mg |
| Indosolblau SF-2G (400%) | 600 mg |
| Indosol E-50 fl | 1440 mg |
| Water | 30 ml |

The treatment of the solution was similar to that in Example 12. The color is insoluble both in acetone and in water.

EXAMPLE 14

In this experiment, the dyeing was carried out using a dispersion dye.
Procedure
Samaronblau HBL was dissolved in acetone, and pigment was added to the solution. The solution was heated and mixed, and evaporated dry.

| | | A | B | C | D |
|---|---|---|---|---|---|
| PS10 pigment | mg | 3000 | 3000 | 3000 | 3000 |
| Samaronblau | mg | 12 | 60 | 150 | 300 |
| Acetone | ml | 30 | 30 | 30 | 30 |

The color does not dissolve in water; however, it does not withstand an acetone wash.

EXAMPLE 15

In this experiment, the effect of salt on the dyeing was studied.

| Procedure | |
|---|---|
| PS10 pigment | 3000 mg |
| Indosolrubinol SFRG | 300 mg |
| $Na_2SO_4$ | 300 mg |
| Indosol E-50 fl | 180 mg |
| Water | 30 ml |

Treatment as in experiment 1. Thereafter, a treatment with Indosol E-50 fl was carried out.

Dyed pigment + 180 mg of Indosol E-50 fl, evaporation until dry.

The color did not dissolve either in water or in acetone. The addition of $Na_2SO_4$ did not produce any visible improvement.

As a result of the dyeing method according to the present invention, colored, platey pigments are obtained which have considerably deeper colors and better retention of color than have those obtained when dyeing an ordinary nacreous pigment with dyestuffs or color pigments.

I claim:

1. A nacreous pigment which contains a dyestuff or a color pigment and is based on metal-oxide-coated mica particles or on other layer silicate particles, characterized in that its particles consist of metal-oxide-coated, porous silica skeletons of mica particles or other silicate particles, containing few or no cations and having at least one dye or one color pigment attached to them, the porous silica skeletons being produced by leaching the mica particles or other layer silicate particles with a mineral acid that removes cations.

2. A nacreous pigment according to claim 1, characterized in that it is a nacreous pigment based on mica particles of dark micas.

3. A nacreous pigment according to claim 1 or 2, characterized in that it is a dyestuff-containing nacreous pigment which contains dyestuff 1–50% by weight, calculated from the amount of pigment dyed.

4. A nacreous pigment according to claim 1, characterized in that the metal-oxide coating is titanium dioxide and/or zirconium dioxide.

5. A nacreous pigment according to claim 1, characterized in that the thickness of the metal oxide layer on the skeleton of a mica particle or other silicate particle is about 0.01–0.5 μm.

6. A nacreous pigment according to claim 1, characterized in that the dye is an azo dye or a quinone dye.

7. A method for the preparation of a dye-containing or color-pigment-containing nacreous pigment based on metal-oxide-coated mica particles or on other layer silicate particles, wherein a) a preliminary-stage product in which the metal oxide coating is poorly soluble or insoluble in acid is prepared from mica particles or other layer silicate particles and a metal-oxide coating, b) the thus obtained coated mica particles or other layer silicate particles are leached with mineral acid, that removes cations characterized in that c) metal-oxide-coated, porous silica skeletons of mica particles or of other layer silicate particles, containing few or no cations, thus produced are directly dyed with at least one dye and/or one color pigment.

8. A method according to claim 7, characterized in that in step c) the pigment and an organic dye are mixed in hot water or an organic solvent, and the water or organic solvent is evaporated.

9. A method according to claim 7, characterized in that step c) is direct dyeing in which the pigment and the dye are slurried separately in water, the dye, when necessary, with an addition of a dispersant, of an organic acid, of a pH control agent and/or of other additives, the obtained mixture is heated to its boiling point or close to it and is maintained at that temperature for a period between 30 minutes and 3 hours, whereafter the pigment is filtered, rinsed and dried.

10. A method according to any of claim 7 or 8 or 9 characterized in that a dark mica is used, the metal oxide is titanium dioxide and/or zirconium oxide and the dye is an azo dye or a quinone dye.

11. A nacreous pigment according to claim 1 in that the mica is phlogopite and the metal oxide is titanium dioxide.

12. A nacreous pigment according to claim 2 in that the dark mica is phlogopite.

13. A nacreous pigment according to claim 4 in that the metal oxide coating is titanium dioxide.

14. A nacreous pigment according to claim 5 in that the metal oxide layer is about 0.1–0.3 μm.

15. A method according to claim 8 characterized in that step c) further comprises subsequent rinsing and drying.

* * * * *